United States Patent
Wu (10) Patent No.: US 7,554,963 B2
(45) Date of Patent: Jun. 30, 2009

(54) METHOD FOR HANDLING DATA DISCARD TIMER AFTER AN RLC RESET OR RE-ESTABLISHMENT IN A WIRELESS COMMUNICATIONS SYSTEM

(75) Inventor: Chih-Hsiang Wu, Taipei Hsien (TW)

(73) Assignee: Innovative Sonic Limited, Tortola (VG)

( * ) Notice: Subject to any disclaimer, the term of this patent is extended or adjusted under 35 U.S.C. 154(b) by 0 days.

(21) Appl. No.: 11/564,304

(22) Filed: Nov. 29, 2006

(65) Prior Publication Data

US 2007/0091895 A1    Apr. 26, 2007

Related U.S. Application Data

(63) Continuation of application No. 10/064,747, filed on Aug. 13, 2002, now Pat. No. 7,227,856.

(51) Int. Cl.
*H04Q 7/24*    (2006.01)
*H04J 3/06*    (2006.01)

(52) U.S. Cl. .................................. 370/338; 370/350

(58) Field of Classification Search .............. 370/338, 370/350
See application file for complete search history.

(56) References Cited

U.S. PATENT DOCUMENTS

| | | | |
|---|---|---|---|
| 6,363,058 B1 | 3/2002 | Roobol et al. | |
| 6,473,399 B1 | 10/2002 | Johansson et al. | |
| 6,862,450 B2 * | 3/2005 | Mikola et al. | 455/438 |
| 6,904,016 B2 | 6/2005 | Kuo et al. | |
| 6,947,394 B1 | 9/2005 | Johansson et al. | |
| 6,950,422 B2 * | 9/2005 | Rinchiuso | 370/346 |
| 6,978,413 B2 | 12/2005 | Han | |
| 7,155,261 B2 | 12/2006 | Chen | |
| 7,209,747 B2 | 4/2007 | Chen et al. | |
| 2001/0018342 A1 * | 8/2001 | Vialen et al. | 455/423 |
| 2001/0029188 A1 | 10/2001 | Sakkinen et al. | |
| 2002/0042270 A1 | 4/2002 | Yi | |
| 2002/0107019 A1 | 8/2002 | Mikola et al. | |
| 2003/0016698 A1 * | 1/2003 | Chang et al. | 370/469 |
| 2003/0092458 A1 | 5/2003 | Kuo | |
| 2003/0095519 A1 * | 5/2003 | Kuo et al. | 370/338 |
| 2004/0037327 A1 * | 2/2004 | Torsner et al. | 370/517 |
| 2004/0042491 A1 | 3/2004 | Sarkkinen et al. | |
| 2004/0071108 A1 | 4/2004 | Wigell | |

(Continued)

FOREIGN PATENT DOCUMENTS

WO    WO-97/04611 A1    2/1997

(Continued)

OTHER PUBLICATIONS

3GPP TS 25.322 V5.1.0 (Jun. 2002).

(Continued)

*Primary Examiner*—Andrew Lee
(74) *Attorney, Agent, or Firm*—Winston Hsu (57) ABSTRACT

A method for handling timers in a wireless communications system includes receiving a Service Data Unit (SDU) and starting a Timer_Discard timer associated with the SDU, performing a reset procedure for a Radio Link Control Acknowledged Mode entity, and not stopping the Timer_Discard timer if the SDU is not discarded in response to the reset procedure.

4 Claims, 8 Drawing Sheets

U.S. PATENT DOCUMENTS

| | | |
|---|---|---|
| 2004/0146033 A1 | 7/2004 | Soderstrom |
| 2004/0203623 A1 | 10/2004 | Wu |
| 2004/0203971 A1 | 10/2004 | Kuo |
| 2006/0098574 A1* | 5/2006 | Yi et al. ............... 370/236 |
| 2007/0140491 A1* | 6/2007 | Yi ............... 380/250 |

FOREIGN PATENT DOCUMENTS

| | | |
|---|---|---|
| WO | WO 01/47206 A2 | 6/2001 |

OTHER PUBLICATIONS

Zhang et al., IEEE International Conference on Communications, vol. 1 of 5, pp. 3346-3350, (Apr. 28, 2002).

Chan et al., IEEE International Conference on Mumbai, pp. 184-188, (Dec. 19, 1997).

Chuah et al., CDMA, Vehicular Technology Conference, 1996. Mobile Technology for the Human Race., IEEE, Apr. 28-May 1, 1996, pp. 272-276, vol. 1.

* cited by examiner

METHOD FOR HANDLING DATA DISCARD TIMER AFTER AN RLC RESET OR RE-ESTABLISHMENT IN A WIRELESS COMMUNICATIONS SYSTEM

CROSS REFERENCE TO RELATED APPLICATIONS

This is a continuation application of application Ser. No. 10/064,747, filed Aug. 13, 2002, which is included in its entirety herein by reference.

BACKGROUND OF THE INVENTION

1. Field of the Invention

The present invention relates to a method for handling timers in a wireless communications system, and more specifically, to a method for handling a Timer_Discard timer after an RLC reset or re-establishment in a wireless communications system.

2. Description of the Prior Art

Technological advances have moved hand in hand with more demanding consumer expectations. Devices that but ten years ago were considered cutting edge are today obsolete. These consumer demands in the marketplace spur companies towards innovation. The technological advances that result only serve to further raise consumer expectations. Presently, portable wireless devices, such as cellular telephones, personal digital assistants (PDAs), notebook computers, etc., are a high-growth market. However, the communications protocols used by these wireless devices are quite old. Consumers are demanding faster wireless access with greater throughput and flexibility. This has placed pressure upon industry to develop increasingly sophisticated communications standards. The 3rd Generation Partnership Project (3GPP) is an example of such a new communications protocol.

Figure 1:
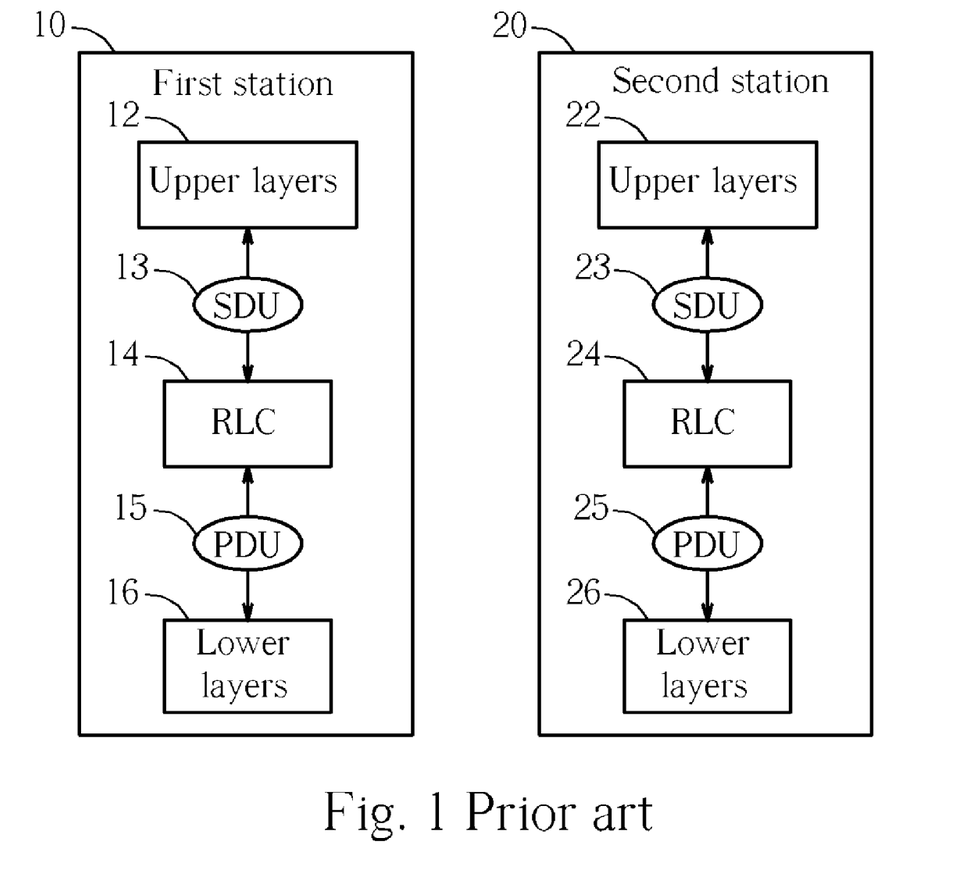
FIG. 1 is a simplified block diagram of the prior art communications model.

Please refer to FIG. 1. FIG. 1 is a simplified block diagram of the prior art communications model. In a typical wireless environment, a first station 10 is in wireless communications with one or more second stations 20. The first station 10 is comprised of upper layers 12, a radio link control (RLC) entity 14, and lower layers 16 which are below the RLC 14. In the following disclosure, all of the RLC entities are assumed to be RLC acknowledged mode (RLC AM) entities. The upper layers 12 can deliver messages to the RLC 14 through service data units (SDUs) 13. The SDUs 13 may be of any size, and hold data that the upper layers 12 wish delivered to the second station 20. The RLC 14 composes the SDUs 13 into one or more protocol data units (PDUs) 15. Each PDU 15 of the RLC 14 is of a fixed size, and is delivered to the lower layers 16. The lower layers 16 include the physical layer, which is in charge of transmitting data to the second station 20.

The second station 20 shown has exactly the same basic structure as the first station 10. The second station 20 also includes upper layers 22, an RLC 24, and lower layers 26. Just as with the first station 10, the second station 20 uses the upper layers 22 to transmit SDUs 23 to the RLC 24, and uses the RLC 24 to transmit PDUs 25 to the lower layers 26. The data transmitted by the first station 10 is received by lower layers 26 of the second station 20 and reconstructed into one or more PDUs 25, which are passed up to the RLC 24. The RLC 24 receives the PDUs 25 and from them assembles one or more SDUs 23, which are then passed up to the upper layers 22. The upper layers 22, in turn, convert the SDUs 23 back into messages, which should be identical to the original messages that were generated by the first station 10. In communication systems, the terms SDU and PDU have broad meanings. For purposes of the following disclosure, the term "SDU" is used to indicate SDUs passed from the upper layers to the RLC, and the term "PDU" should be understood as PDUs passed from the RLC to lower layers. In addition, for simplicity the following disclosure will be written from the perspective of the first station 10, unless otherwise noted.

Figure 2:
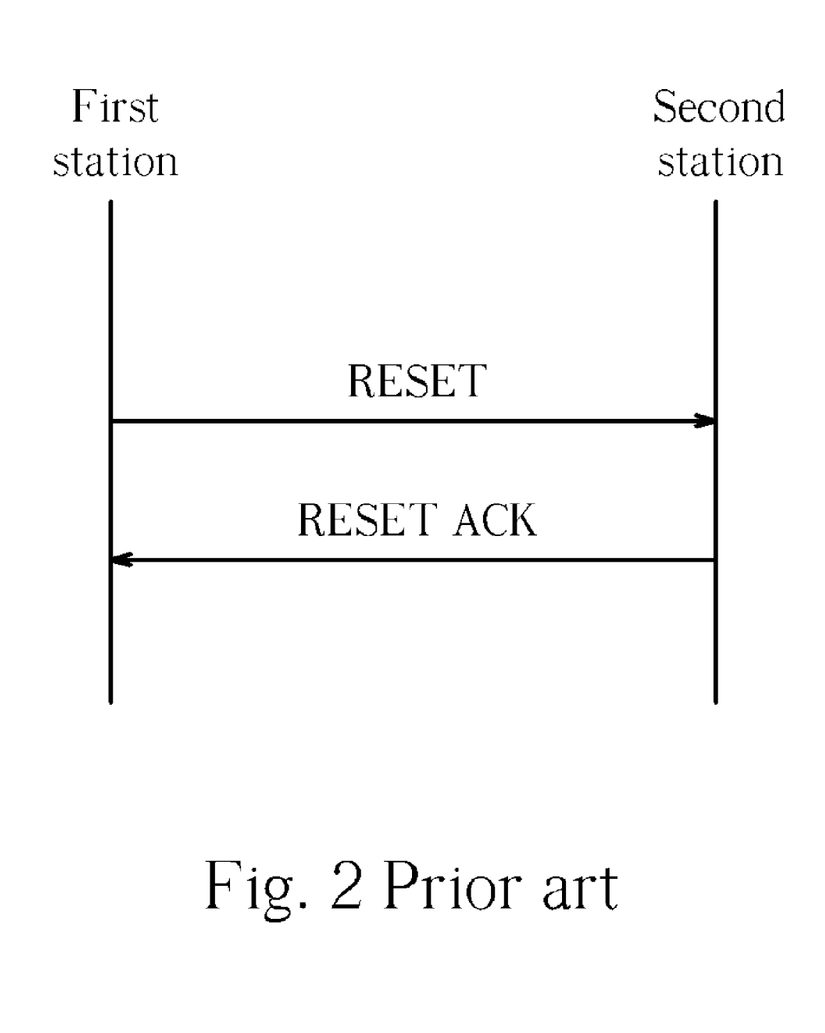
FIGS. 2 and 3 are message sequence charts illustrating a reset procedure for peer RLC AM entities according to the prior art.
Figure 3:
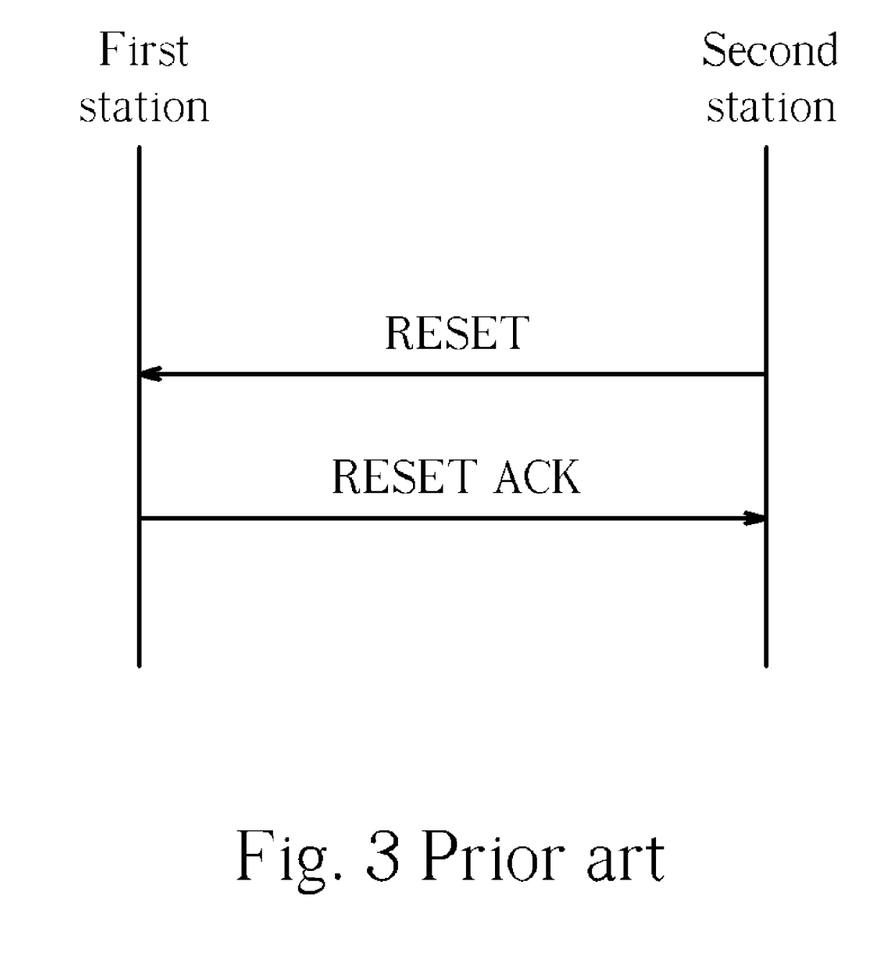

Please refer to FIGS. 2 and 3. FIGS. 2 and 3 are message sequence charts illustrating a reset procedure for peer RLC AM entities according to the prior art. In all the message sequence charts used in the following disclosure, the progression of time is shown from top to bottom. In FIG. 2, the first station 10 is shown initiating the reset procedure by sending a RESET PDU to the second station 20. From the perspective of the first station 10, the reset procedure begins with transmission of the RESET PDU, and is not finished until a RESET ACK PDU is received from the second station 20. From the perspective of the second station 20, the reset procedure begins upon reception of the RESET PDU, and ends after transmission of the RESET ACK PDU to the first station 10. In FIG. 3, the opposite scenario is shown. That is, the second station 20 initiates the reset procedure by sending a RESET PDU to the first station 10, and the first station 10 acknowledges this RESET PDU by sending a RESET ACK PDU to the second station 20. Therefore, either one of the peer RLC entities 14 and 24 contained in the first and second stations 10 and 20 can initiate a reset procedure.

Resetting the RLC 14 is defined by the $3^{rd}$ Generation Partnership Project (3GPP) specification 3GPP TS 25.322 V3.11.0 "RLC Protocol Specification", which is included herein by reference. According to the current RLC reset procedure for acknowledged mode, all timers except for a Timer_RST timer are stopped for each peer RLC AM entity upon completion of the reset procedure for that entity. Therefore, Timer_Poll, Timer_Poll_Prohibit, Timer_EPC, Timer_Discard, Timer_Poll_Periodic, Timer_Status_Prohibit, Timer_Status_Periodic, and Timer_MRW are all stopped during a reset procedure. For an example, please refer back to FIG. 2. All of the timers except for the Timer_RST timer would be stopped by the RLC entity 24 of the second station 20 after the RESET ACK PDU is sent to the first station 10. In addition, all of the timers would be stopped by the RLC entity 14 of the first station 10 after the RESET ACK PDU is received from the second station 20.

During an RLC re-establishment function for acknowledged mode and unacknowledged mode, upper layers may request re-establishment of an RLC entity. However, the 3GPP TS 25.322 V3.11.0 specification does not specify how each of the previously mentioned timers should be handled during re-establishment. Due to this lack of guidelines, potential problems could develop due to the improper use of the timers.

Figure 4:
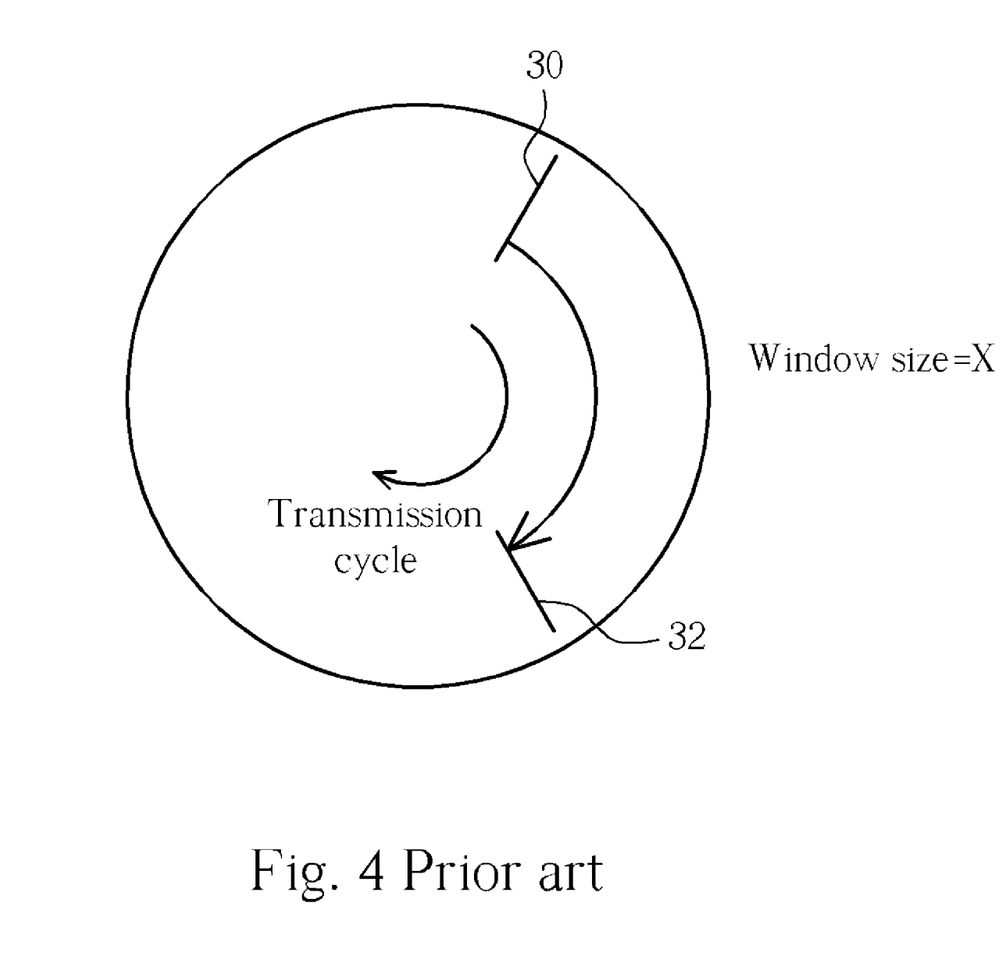
FIG. 4 is a phase diagram illustrating a transmission window of an RLC AM entity according to the prior art.

Please refer to FIG. 4. FIG. 4 is a phase diagram illustrating a transmission window of an RLC AM entity according to the prior art. During normal operation, the RLC AM entity 14 (transmitter) transmits acknowledged mode data (AMD) PDUs to the RLC AM entity 24 (receiver), and each PDU is marked with a sequence number (SN). The SNs have a fixed bit length of n bits. In the preferred embodiment, the bit length n is 12. Hence, the SNs have a range of values from zero to 4095 ($2^{12}$-1). The phase diagram for SNs can thus be represented by a circle. For the following example, point 30 is the sequentially lowest transmitter PDU SN value waiting for acknowledgment from the receiver in the form of a STATUS PDU, which contains information on which PDUs have been acknowledged. In other words, point 30 marks the beginning of the transmitting window. In this example, assume a window size =X. Point 32 marks the highest PDU SN value of an AMD PDU that has been sent so far. Therefore, in order to prevent the transmitting window from filling up, the difference of PDU SN values at point 32 and point 30 has to be less than X. Otherwise, the transmitting window fills up, and deadlock occurs. Deadlock can occur if AMD PDUs sent from the transmitter to the receiver are not properly acknowledged by the receiver. This would cause point 30 to remain stationary, and the difference between point 32 and point 30 would eventually equal the maximum window size of X.

Figure 5:
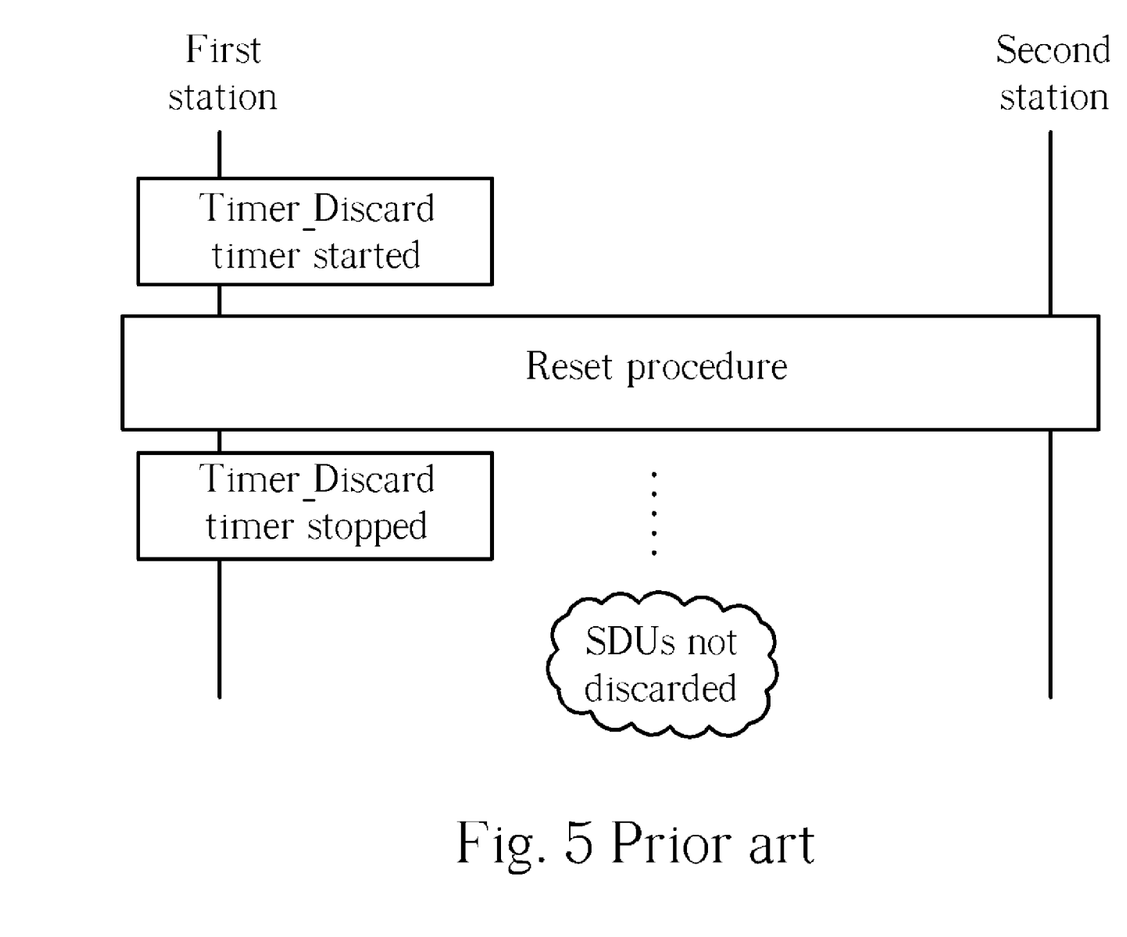
FIG. 5 is a message sequence chart illustrating problems occurring with the Timer_Discard timer during the prior art reset procedures.

Please refer to FIG. 5. FIG. 5 is a message sequence chart illustrating problems occurring with the Timer_Discard timer during the prior art reset procedure. The Timer_Discard timer is used by the peer RLC entities 14 and 24 (although only RLC AM entity 14 will be used as an example) to determine when SDUs 13 received from upper layers should be discarded. For each SDU 13 the RLC AM entity 14 receives from upper layers, a corresponding Timer_Discard timer is started for that SDU. When the Timer_Discard timer of the RLC AM entity 14 expires, the corresponding SDU 13 is discarded if the SDU 13 still remains in the RLC AM entity 14.

First of all, the Timer_Discard timer is started for each SDU 13 when the RLC AM entity 14 receives the SDUs 13 from upper layers. Next, upon reception of a RESET PDU or a RESET ACK PDU, the RLC AM entity 14 is reset, which causes the Timer_Discard timer for each SDU 13 to be stopped. Unfortunately, none of the Timer_Discard timers for the corresponding SDUs 13 are ever restarted after the reset procedure. Therefore, the Timer_Discard timers do not ever get started again, and the corresponding SDUs 13 are never appropriately dealt with. Since these SDUs 13 being held in the RLC AM entity 14 cannot be discarded, the RLC AM entity 14 is not able to properly account for these SDUs 13, and quality of service (QoS) cannot be maintained.

Therefore, since the current 3GPP specification does not specify how each of the previously mentioned timers should be handled during re-establishment, deadlock can occur and quality of service may be reduced substantially.

SUMMARY OF THE INVENTION

It is therefore a primary objective of the claimed invention to provide a method for handling a data discard timer after an RLC reset or re-establishment in a wireless communications system in order to solve the above-mentioned problems.

According to the claimed invention, a method for handling a Timer_Discard timer in a wireless communications system includes receiving a Service Data Unit (SDU) and starting the Timer_Discard timer associated with the SDU, performing a reset procedure for a Radio Link Control Acknowledged Mode entity, and not stopping the Timer_Discard timer if the SDU is not discarded in response to the reset procedure.

These and other objectives of the present invention will no doubt become obvious to those of ordinary skill in the art after reading the following detailed description of the preferred embodiment that is illustrated in the various figures and drawings.

DETAILED DESCRIPTION

Figure 6:
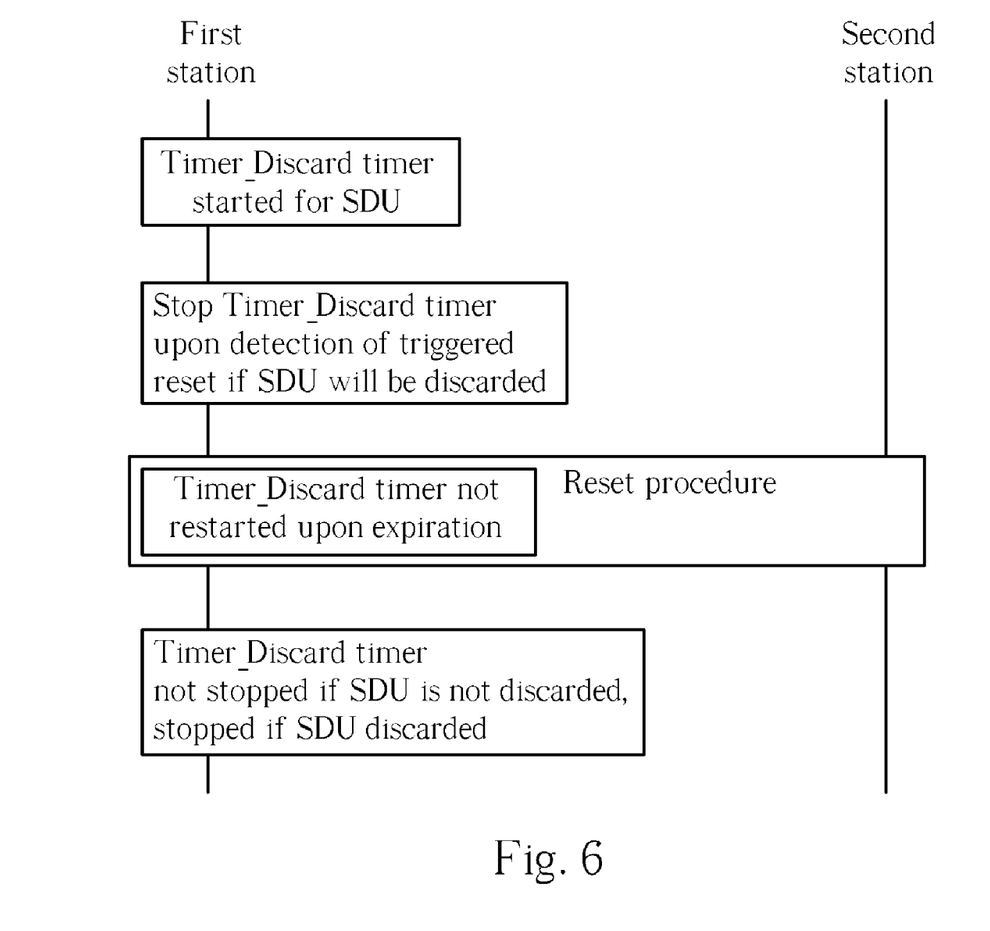
FIGS. 6 and 7 are message sequence charts illustrating handling of the Timer_Discard timer during a reset procedure according to the present invention.
Figure 7:
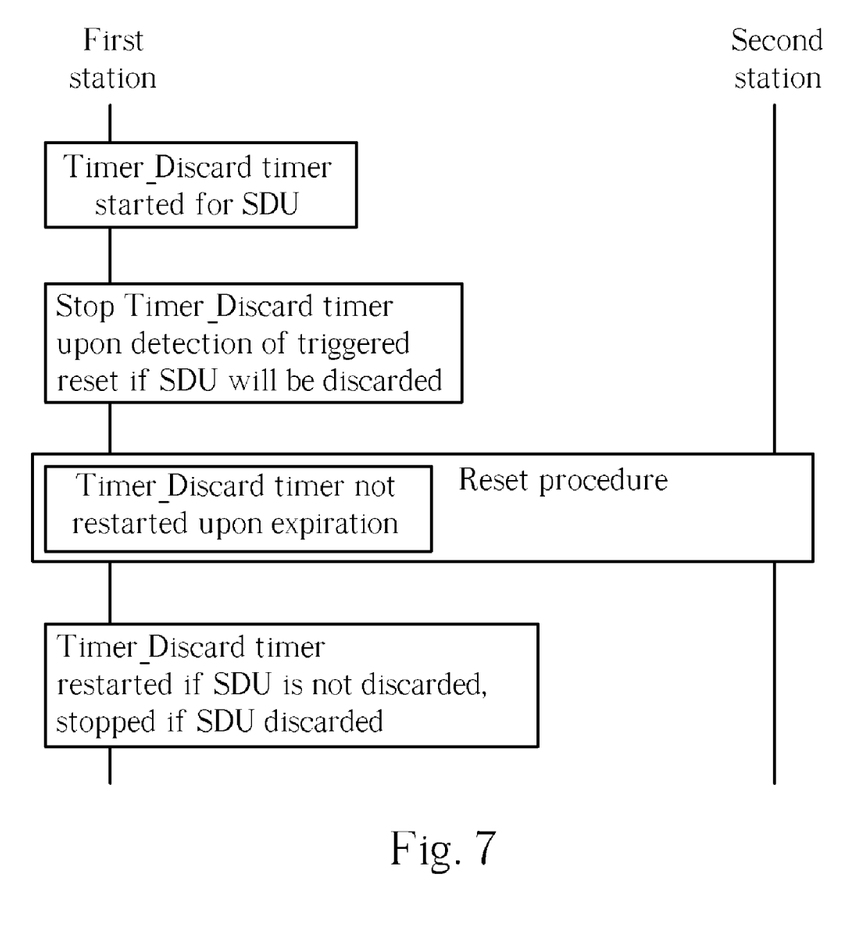

Please refer to FIGS. 6 and 7. FIGS. 6 and 7 are message sequence charts illustrating handling of the Timer_Discard timer during a reset procedure according to the present invention. First of all, the Timer_Discard timer is started for each SDU 13 of the RLC AM entity 14 when the SDU 13 is received from upper layers. Next, if the RLC AM entity 14 is triggered to send a RESET PDU to the RLC AM entity 24, the present method invention includes stopping the Timer_Discard timer if the corresponding SDU 13 will be discarded. After that, the RLC AM entity 14 begins a reset procedure by sending a RESET PDU to the RLC AM entity 24 of the second station 20. When the RLC AM entity 14 has already transmitted a RESET PDU to the RLC AM entity 24 and has not yet received acknowledgement in the form of a RESET ACK PDU, if the Timer_Discard timer expires, the present method invention includes not restarting the Timer_Discard timer. The reset procedure is then concluded when the RLC AM entity 14 receives a RESET ACK PDU. Upon reception of this RESET ACK PDU, the present invention method includes not stopping the Timer_Discard timer if the corresponding SDU 13 is not discarded, or stopping the Timer_Discard timer if the corresponding SDU 13 is discarded. Alternately, as shown in FIG. 11 B, the present invention method includes restarting the Timer_Discard timer if the corresponding SDU 13 is not discarded, or stopping the Timer_Discard timer if the corresponding SDU 13 is discarded. On the other hand, suppose the RLC AM entity 24 of the second station 20 is also running a Timer_Discard timer. When the RLC AM entity 24 receives the RESET PDU to begin the reset procedure, the present invention method includes not stopping or restarting the Timer_Discard timer if the corresponding SDU 23 is not discarded, or stopping the Timer_Discard timer if the corresponding SDU 23 is discarded.

Thus, for a reset procedure, the handling of the Timer_Discard timer can be summarized as follows: if the condition for triggering a reset procedure is detected, the Timer_Discard timer is stopped if the corresponding SDU will be discarded; when a RESET PDU has already been transmitted and not yet been acknowledged by a RESET ACK PDU, if the Timer_Discard timer expires, the Timer_Discard timer is not restarted; upon reception of a RESET PDU or RESET ACK PDU, the Timer_Discard timer is not stopped or is restarted if the corresponding SDU is not discarded; and upon reception of a RESET PDU or RESET ACK PDU, the Timer_Discard timer is stopped if the corresponding SDU is discarded. Please note that the Timer_Discard timer can be stopped when the condition for triggering the reset was detected, or upon reception of the RESET PDU or RESET ACK PDU if the corresponding SDU is discarded. By not stopping or restarting the Timer_Discard timer for SDUs 13 that will not be discarded, the RLC AM entity 14 will still be able to account for SDUs 13 that are not discarded, and will maintain quality of service.

Figure 8:
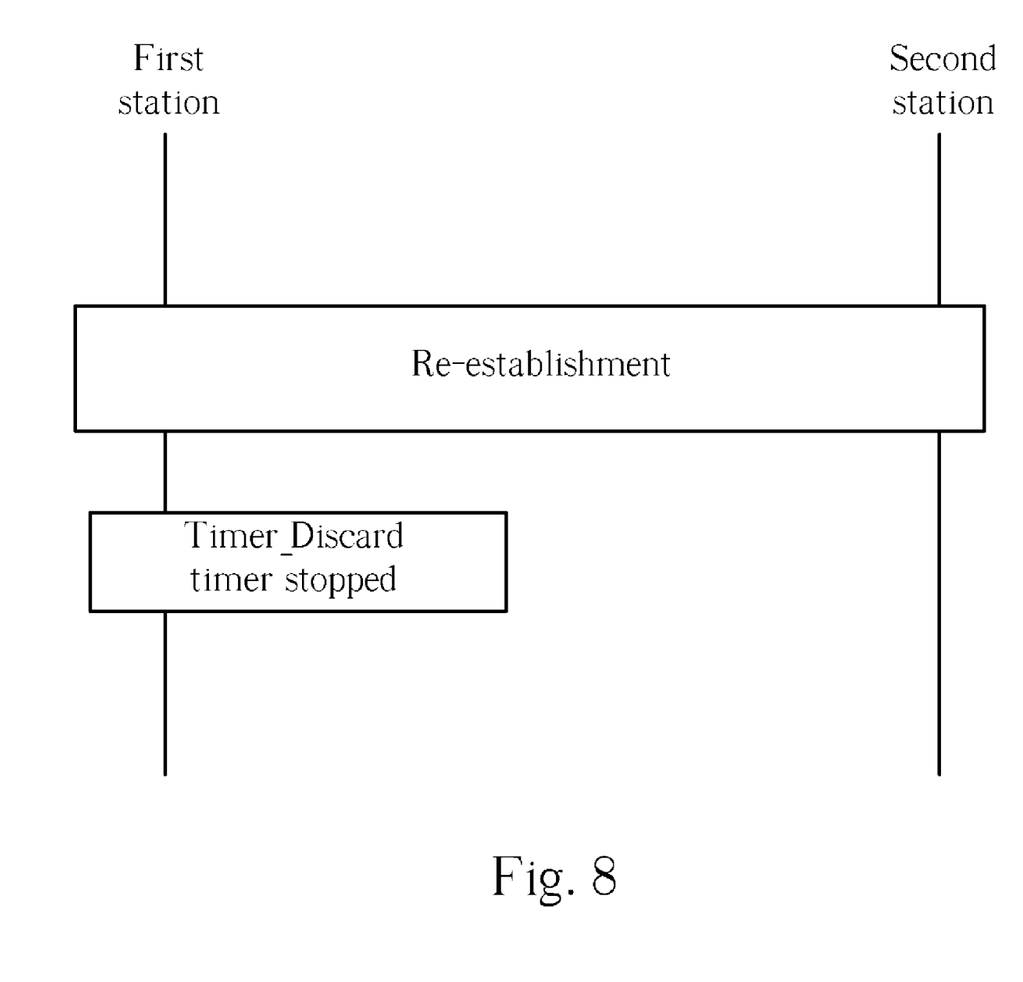
FIG. 8 is a message sequence chart illustrating handling of the Timer_Discard timer during a re-establishment function according to the present invention.

Please refer to FIG. 8. FIG. 8 is a message sequence chart illustrating handling of the Timer_Discard timer during a re-establishment function according to the present invention. After the RLC AM entity 14 is re-established by upper layers, the present invention method includes stopping the Timer_Discard timer since all corresponding SDUs will be discarded.

Compared to the prior art, the present invention provides steps for handling the Timer_Discard timer before, during, and after a reset procedure, as well as after re-establishment. Therefore, using the method specified in the present invention will prevent RLC AM entities from experiencing deadlock, and will help maintain the quality of service.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling a Timer_Discard timer, in a wireless communications system, the method comprising:
   receiving a Service Data Unit (SDU) and staffing the Timer_Discard timer associated with the SDU;
   performing a reset procedure for a Radio Link Control Acknowledged Mode (RLC AM) entity; and
   not stopping the Timer_Discard timer if the SDU is not discarded in response to the reset procedure.

2. A method for handling a Timer_Discard timer, in a wireless communications system, the method comprising:
   receiving a Service Data Unit (SDU) and starting the Timer_Discard timer associated with the SDU;
   performing a reset procedure for a Radio Link Control Acknowledged Mode (RLC AM) entity;
   not stopping the Timer_Discard timer if the SDU is not discarded in response to the reset procedure;
   maintaining a value of the Timer_Discard timer if the Timer_Discard timer expires prior to the completion of the reset procedure;
   stopping the Timer_Discard timer if the SDU is discarded in response to the reset procedure; and
   restarting the Timer_Discard timer, or maintaining a value of the Timer_Discard timer and maintaining operation of the Timer_Discard timer if the SDU is not discarded in response to the reset procedure.

3. The method of claim 1 further comprising stopping the Timer_Discard timer if the SDU is discarded and if a condition for triggering the reset procedure is detected.

4. A method for handling a Timer_Discard timer in a wireless communications system, the method comprising:
   receiving a Service Data Unit (SDU) and staffing the Timer_Discard timer associated with the SDU;
   re-establishing the RLC AM entity; and
   not stopping the Timer_Discard timer after re-establishment of the RLC AM entity if the SDU is not discarded in response to the re-establishment procedure.

* * * * *